(12) United States Patent
Feris et al.

(10) Patent No.: US 8,670,611 B2
(45) Date of Patent: Mar. 11, 2014

(54) BACKGROUND UNDERSTANDING IN VIDEO DATA

(75) Inventors: Rogerio S. Feris, White Plains, NY (US); Yun Zhai, Bedford Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 13/279,504

(22) Filed: Oct. 24, 2011

(65) Prior Publication Data

US 2013/0101208 A1    Apr. 25, 2013

(51) Int. Cl.
*G06K 9/34* (2006.01)

(52) U.S. Cl.
USPC .......................................... 382/164; 382/199

(58) Field of Classification Search
USPC .................... 382/164, 173–176, 199
See application file for complete search history.

(56) References Cited

U.S. PATENT DOCUMENTS

| | | | |
|---|---|---|---|
| 5,099,322 A * | 3/1992 | Gove ............................. | 348/700 |
| 6,587,156 B1 | 7/2003 | Stubler | |
| RE38,420 E | 2/2004 | Thomas | |
| 6,771,816 B1 * | 8/2004 | Gaither ......................... | 382/176 |
| 7,808,559 B2 | 10/2010 | Zhu et al. | |
| 2004/0151358 A1 * | 8/2004 | Yanagita et al. ............... | 382/132 |
| 2006/0245618 A1 | 11/2006 | Boregowda et al. | |
| 2008/0055314 A1 * | 3/2008 | Ziemski ......................... | 345/441 |
| 2008/0069408 A1 | 3/2008 | Cervantes | |
| 2008/0307342 A1 * | 12/2008 | Furches et al. ................. | 715/764 |
| 2008/0317345 A1 * | 12/2008 | Wiedemann et al. .......... | 382/181 |
| 2010/0054538 A1 * | 3/2010 | Boon .............................. | 382/104 |
| 2011/0103646 A1 * | 5/2011 | Zeller et al. .................... | 382/103 |
| 2011/0103648 A1 * | 5/2011 | Wiedemann et al. .......... | 382/103 |
| 2011/0200238 A1 * | 8/2011 | Garud et al. .................... | 382/128 |
| 2012/0288190 A1 * | 11/2012 | Tang .............................. | 382/165 |

\* cited by examiner

*Primary Examiner* — Jingge Wu
(74) *Attorney, Agent, or Firm* — Patrick J. Daugherty; Driggs, Hogg, Daugherty & Del Zoppo Co., LPA

(57) ABSTRACT

Long-term understanding of background modeling includes determining first and second dimension gradient model derivatives of image brightness data of an image pixel along respective dimensions of two-dimensional, single channel image brightness data of a static image scene. The determined gradients are averaged with previous determined gradients of the image pixels, and with gradients of neighboring pixels as a function of their respective distances to the image pixel, the averaging generating averaged pixel gradient models for each of a plurality of pixels of the video image data of the static image scene that each have mean values and weight values. Background models for the static image scene are constructed as a function of the averaged pixel gradients and weights, wherein the background model pixels are represented by averaged pixel gradient models having similar orientation and magnitude and weights meeting a threshold weight requirement.

15 Claims, 5 Drawing Sheets

BACKGROUND UNDERSTANDING IN VIDEO DATA

BACKGROUND

Background understanding in video analytics applications refers to modeling the background of video image data, the static (non-moving) part of a static camera field-of-view that defines or otherwise belongs to the environmental settings of the image. For example, the road that moving objects travel upon, a building that moving pedestrians enter and exit, etc. By knowing the background and performing a difference operation between current video frame images with the background, moving foreground objects may be detected and identified, enabling other video analytics operations appropriate for the detected object, such as moving object tracking, classification, activity significance recognition and determination, etc.

BRIEF SUMMARY

In one embodiment of the present invention, a method for long-term understanding of background modeling includes determining a first dimension gradient model derivative of image brightness data of an image pixel along a first dimension of two-dimensional image data, and a second dimension gradient model derivative of the image brightness data of the image pixel along the second dimension of the two-dimensional image data, wherein the image brightness data is single channel of color information extracted from video image data of a static image scene. A processing unit averages the determined gradients with any previous determined gradients of the image pixel, and with gradients of each of a plurality of neighboring pixels as a function of the respective distances of the neighboring pixels to the image pixel, the averaging generating averaged pixel gradient models for each of a plurality of pixels of the video image data of the static image scene that each have mean values and weight values. Thus, the processing unit constructs background models for the static image scene as a function of the averaged pixel gradient model mean values and weight values, wherein each pixel in the background model is represented by a set of the averaged pixel gradient models that each have similar orientation and magnitude and have a weight meeting a background threshold weight requirement.

In another embodiment, a method for providing a service for long-term understanding of background modeling includes providing one or more articles, including a gradient determiner that uses features extracted from input video data to determine dimensional gradient models for pixel image data of the input video, and defines average image pixel gradient models for each pixel of the pixel image data by averaging the determined gradients with previous gradients of the each pixel, and also with gradients of neighboring pixels as a function of their distance to the pixel. A background modeler is provided that constructs and updates background pixel models for a static image scene of the input video data by using the averaged pixel gradient data that have similar orientation and magnitude for each of a plurality of pixel model sets, wherein each pixel model set is associated with a weight determinative as to whether each pixel model set represents background or non-background pixel data. A foreground estimator is also provided that uses the constructed and updated background models to estimate foreground areas in the static image scene of the input video data by comparing the averaged pixel gradients with corresponding ones of the background models, wherein a pixel is determined to be a foreground and not a background pixel if a distance from the averaged pixel gradient data to a corresponding background model pixel set is equal to or above a threshold distance value, or if the distance is less than the threshold but it is closer to another foreground model pixel set than to the corresponding background model pixel set.

In another embodiment, a system has a processing unit, computer readable memory and a computer readable storage medium device with program instructions, wherein the processing unit, when executing the stored program instructions, determines a first dimension gradient model derivative of image brightness data of an image pixel along a first dimension of two-dimensional image data, and a second dimension gradient model derivative of the image brightness data of the image pixel along the second dimension of the two-dimensional image data, wherein the image brightness data is single channel of color information extracted from video image data of a static image scene. The processing unit further averages the determined gradients with any previous determined gradients of the image pixel, and with gradients of each of a plurality of neighboring pixels as a function of the respective distances of the neighboring pixels to the image pixel, the averaging generating averaged pixel gradient models for each of a plurality of pixels of the video image data of the static image scene that each have mean values and weight values. Thus, the processing unit constructs background models for the static image scene as a function of the averaged pixel gradient model mean values and weight values, wherein each pixel in the background model is represented by a set of the averaged pixel gradient models that each have similar orientation and magnitude and have a weight meeting a background threshold weight requirement.

In another embodiment, an article of manufacture has a computer readable storage medium device with computer readable program code embodied therewith, the computer readable program code comprising instructions that, when executed by a computer processor, cause the computer processor to determine a first dimension gradient model derivative of image brightness data of an image pixel along a first dimension of two-dimensional image data, and a second dimension gradient model derivative of the image brightness data of the image pixel along the second dimension of the two-dimensional image data, wherein the image brightness data is single channel of color information extracted from video image data of a static image scene. A computer processor is further caused to average the determined gradients with any previous determined gradients of the image pixel, and with gradients of each of a plurality of neighboring pixels as a function of the respective distances of the neighboring pixels to the image pixel, the averaging generating averaged pixel gradient models for each of a plurality of pixels of the video image data of the static image scene that each have mean values and weight values. Thus, the computer processor constructs background models for the static image scene as a function of the averaged pixel gradient model mean values and weight values, wherein each pixel in the background model is represented by a set of the averaged pixel gradient models that each have similar orientation and magnitude and have a weight meeting a background threshold weight requirement.

BRIEF DESCRIPTION OF THE SEVERAL VIEWS OF THE DRAWINGS

These and other features of this invention will be more readily understood from the following detailed description of the various aspects of the invention taken in conjunction with the accompanying drawings in which.

Figure 1:
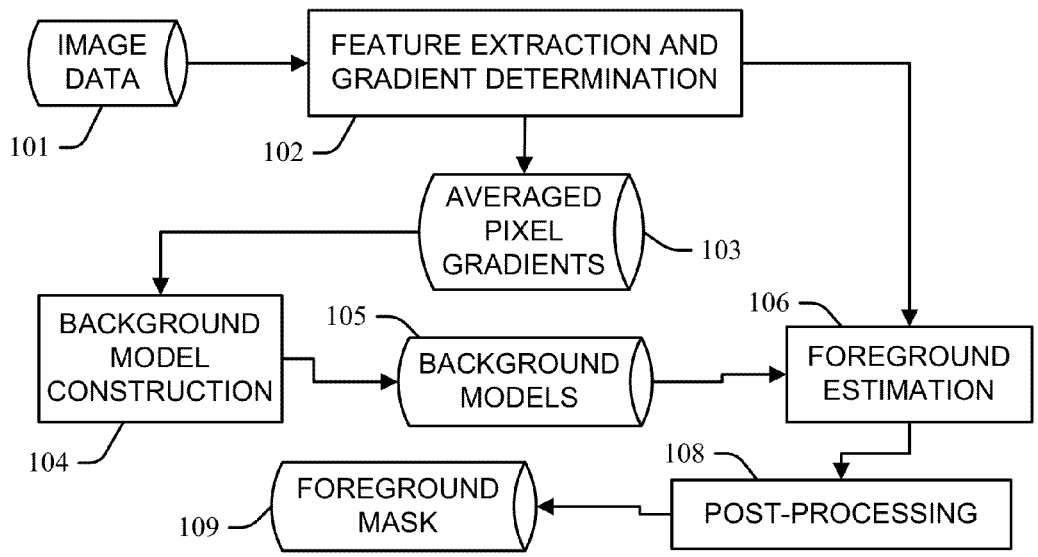
FIG. 1 is a block diagram illustration of an embodiment of a method, process or system for automated long-term understanding of background modeling according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

A variety of approaches are used for background modeling in computer vision, multimedia signal processing, robotics, and other video analytics applications. Examples include feature perspective processes based on analysis of raw pixel colors in Red-Green-Blue (RGB) values or Hue, Saturation, and Value (HSV) image planes, and textures perspective processes that consider local binary patterns, edges, etc. However, raw color approaches do not handle lighting changes well. Additionally, raw color and texture process also generally implement adaptation techniques wherein background models tend to adapt to more recent changes in the image scene different than changes determined over longer time periods. More particularly, background models constructed using parametric formulations such as Gaussian mixture models, or through non-parametric approaches such as kernel density estimation, typically assign higher weights for more recently obtained pixel samples. As a result, such systems tend to adapt their models in response to the most recent static image information, the background models effectively forgetting previous scene object contents over time.

FIG. 1 illustrates a method, process or system for long-term understanding of background modeling. At 102 features extracted from input video data 101 are used to determine dimensional gradient models for the image data pixels, first-order derivatives of the image pixel brightness along each of the dimensions of the image; thus, for two-dimensional image data, along horizontal (x) and vertical (y) dimensions. The determined gradients are used to define average image pixel gradient models 103 for the pixels by averaging the determined gradients with all previous gradients of the pixel, and also with gradients of neighboring pixels as a function of their distance to the pixel. At 104 background models 105 are constructed and updated using the averaged pixel gradient data 103 as input, wherein each pixel is represented by a set of gradient models, via means of gradient samples having similar orientation and magnitude, and wherein each model set is also associated with a weight which determines if the pixel represents background or non-background data, the weighting independent of time of the pixel data.

At 106 the constructed background models 105 are used to estimate foreground areas in the image by comparing the averaged pixel gradients 103 with the corresponding background models 105. More particularly, a pixel is determined to be a foreground (non-background) pixel at 106 if: (a) the distance from the pixel's gradient to the background model is equal to or above a threshold distance value, or (b) if the distance is less than the threshold, but it is closer to another foreground model than to the background model. The results of the foreground and background determinations at 106 are processed at 108, and the foreground pixels used to define a foreground mask 109 representing a foreground object.

Figure 2:
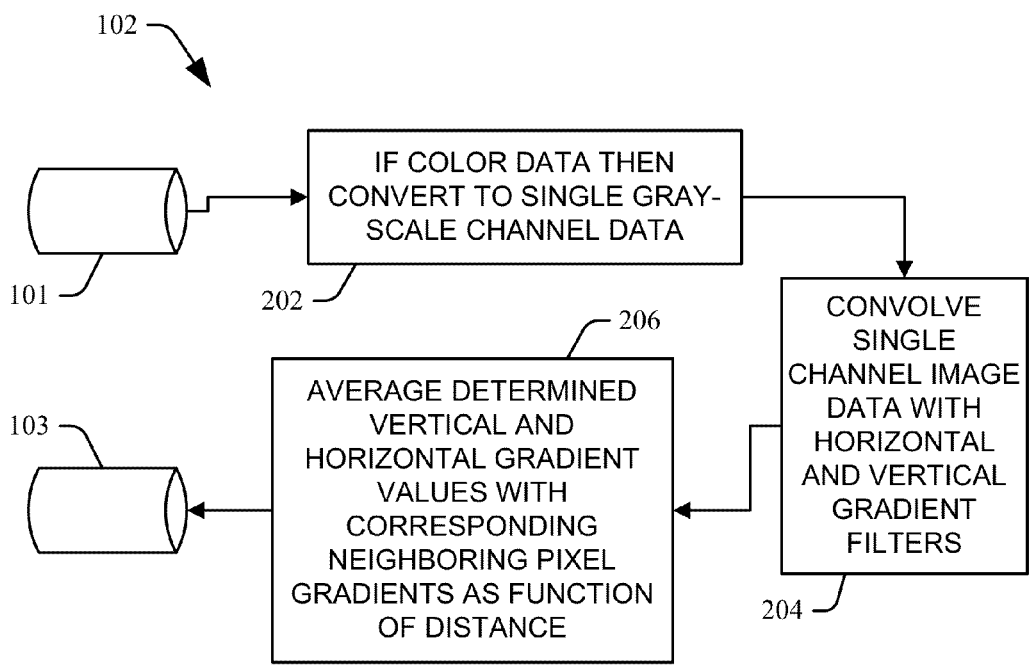
FIG. 2 is a block diagram illustration of an embodiment of a method, process or system for feature extraction and average image pixel gradient determination according to the present invention.
Figure 3:
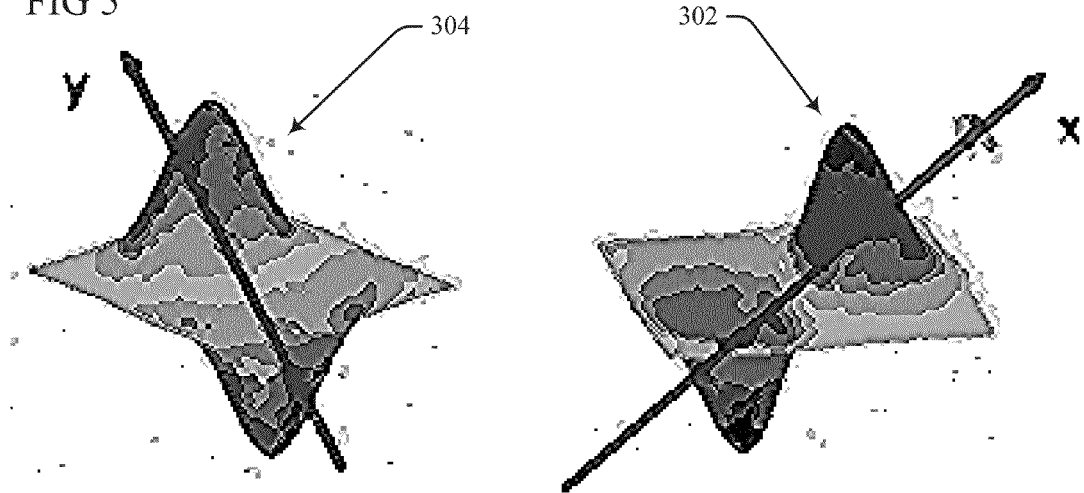
FIG. 3 is a diagrammatic illustration of dimension Gaussian filter derivatives for use with an embodiment of the present invention.
Figure 4:
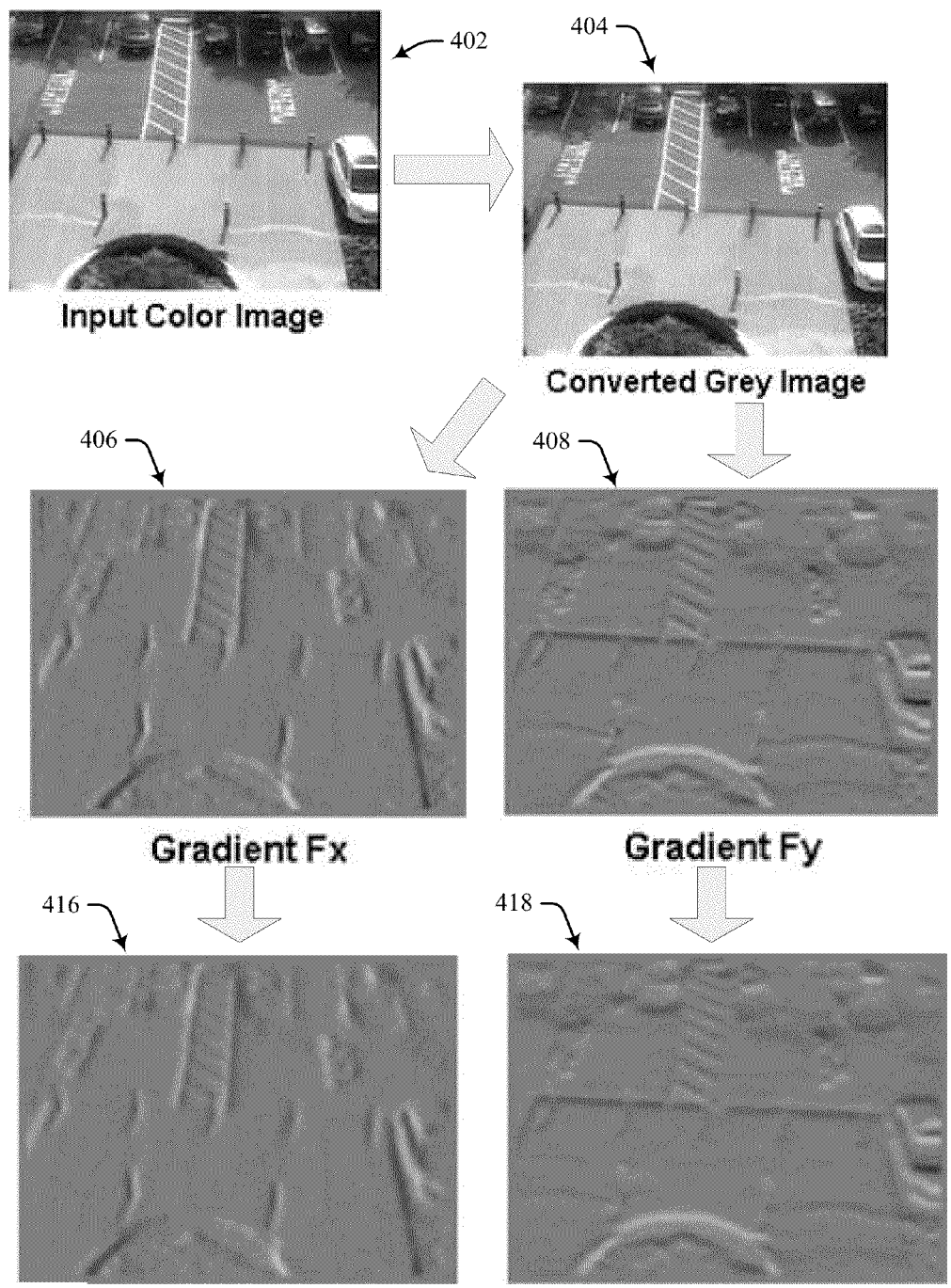
FIG. 4 is a block diagram illustration of an embodiment of a method, process or system of the present invention.

FIG. 2 illustrates one embodiment of a process for feature extraction and average image pixel gradient determination at 102 of FIG. 1. If the input video data 101 is color image data (i.e., having more than one channel of color information) then at 202 the image data is converted to a grey-scale image, such that only one channel is maintained for the image data. At 204 the image data is convolved with dimension-specific gradient filters for each dimension of the image data. In the present embodiment, the image data is two-dimensional data, and thus convolving comprises using one filter for the horizontal (x) dimension and another one for vertical (y) dimension, to generate image pixel gradients for each dimension, which may be notated as (p_x, p_y). (Other embodiments for use with other dimensions would use additional filters for each dimension, thus three dimensional imaging would use three filters, etc.) The present example uses derivatives of Gaussian filters for each dimension, for example the horizontal (x) Gaussian filter derivative 302 and the vertical (y) Gaussian filter derivative 304 illustrated in FIG. 3 though, as will be appreciated by one skilled in the art, a variety of other filters may also be used, such as triangular filters, sinusoid filters, etc. FIG. 4 illustrates one example of the process, wherein an input color image 402 from the input data 101 is converted at 202 into a grey-scale image 402, which is then convolved at 204 to generate a horizontal dimension pixel gradient (Fx) 406 and a vertical dimension pixel gradient (Fy) 408.

At 206 pixel gradients are refined as a function of determining average or weighted gradient mean values of the respective vertical and horizontal gradient values with the corresponding vertical and horizontal gradient values of the pixels within the neighborhood of the image pixel to generate the average pixel gradients 103. In one aspect, by using the average pixel gradients 103 as basis data for generating background models, rather than using individual pixel gradient data independent of considering the context of neighborhood pixels as taught by the prior art, the background models generated by embodiments of the present invention are found to be robust against minor object motions within the image data, for example against minor motions caused by waving tree branches and camera shakes.

Figure 5:
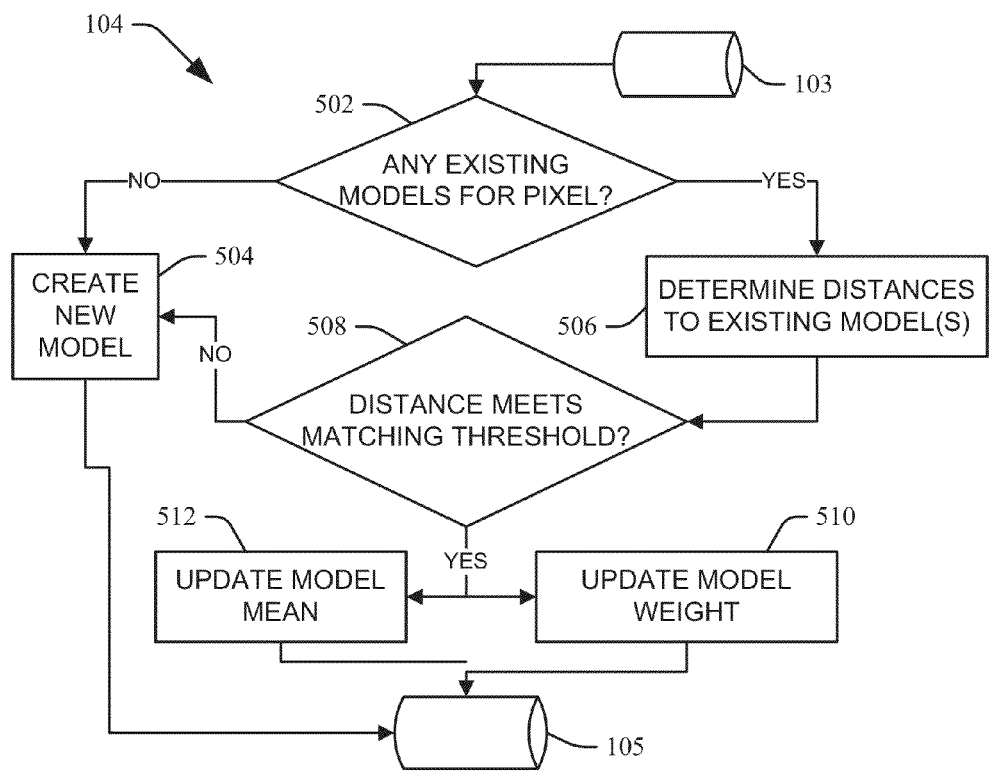
FIG. 5 is a block diagram illustration of an embodiment of a method, process or system for constructing background models.

FIG. 5 illustrates one embodiment of the process for constructing background models at 104. In response to an average pixel gradient 103 input, the process determines at 502 if there is an existing model for that pixel. If not, then at 504, a first model is initiated for the input pixel using its current average pixel gradient data as the model mean, and with an initial weight of one. The initial weight may also be an empirically determined value. In one example, the pixel models may be represented by $M_i(u, w)$, where "u" is the mean, and "w" is the weight, and the input pixel gradient may be designated $F=(f_x, f_y)$.

If instead it is determined at 502 that there are existing models for the pixel, then at 506 distances are determined between the new input pixel gradient F and the means of each of the existing models M to find a model $M_O$ having the smallest distance $D(F, M_O)$. The present embodiment use a Euclidean distance D, though it will be appreciated that a variety of ways may be used to compute such a distance, for example a Normal kernel process, and still others will be apparent to one skilled in the art. At 508 the smallest model distance $D(F, M_O)$ is compared to a threshold matching value. If the distance $D(F, M_O)$ is greater than this threshold at 508, then at 504 a new model is initiated for the input pixel using its average pixel gradient data as the model mean, and again with an initial weight of one.

Otherwise, if the distance $D(F, M_O)$ meets the matching threshold requirements at 508, then the existing model $M_O$ is updated at 510 and 512. More particularly, the mean (u) of the model $M_O$ is updated at 512 with an absolute average determined by: $u_{T+1}=(u_T*w+F)/(w+1)$, wherein "w" is the total number of model samples taken at different times (T). By using the absolute average to update the mean the process at 104 ensures that each of the samples obtained will have equal weights in the model construction process, regardless of the time that the sample came in. Thus, the present embodiment avoids adaptation problems prevalent in prior art approaches that assume fixed weights for more recent samples.

The weight of the target model $M_O$ is updated at 510 by incrementing the weight by one, and a kernel density estimation technique assigns weights to neighboring models. More particularly, the new weight for any non-matching model is updated with a factor defined by a decaying kernel function (K(D(F, M))), where D is the distance between the new gradient and the target model, and wherein the maximum of decaying kernel function is at the new gradient value and it decreases in all directions. The present example uses a Gaussian decaying kernel function, though any of a variety of decaying kernel functions may be used, such as linear kernels, log kernels, etc. In one aspect, the present embodiment differs from prior art approaches that implement a rule of exclusion wherein only the weight of the matched model is incremented while weights of other models remain the same. Such prior art approaches do not adequately handle edge cases where the new sample is at middle range between two or more models; even though a matching model can be found in this case, the other nearby model should not be omitted from consideration.

At 512 the background models are updated in response to the first or new models created at 504 and/or the target model $M_O$ updated at 510 and 512, wherein the models with the largest weights representing the background and the other models represent non-background information (e.g., moving objects). The embodiment may also place the model with the largest weight in the beginning, in one aspect to avoid sorting costs at each round or iteration of model update. Additionally, if two models have the same weights, then the one with the latest in time observations may be considered as the background model.

Figure 6:
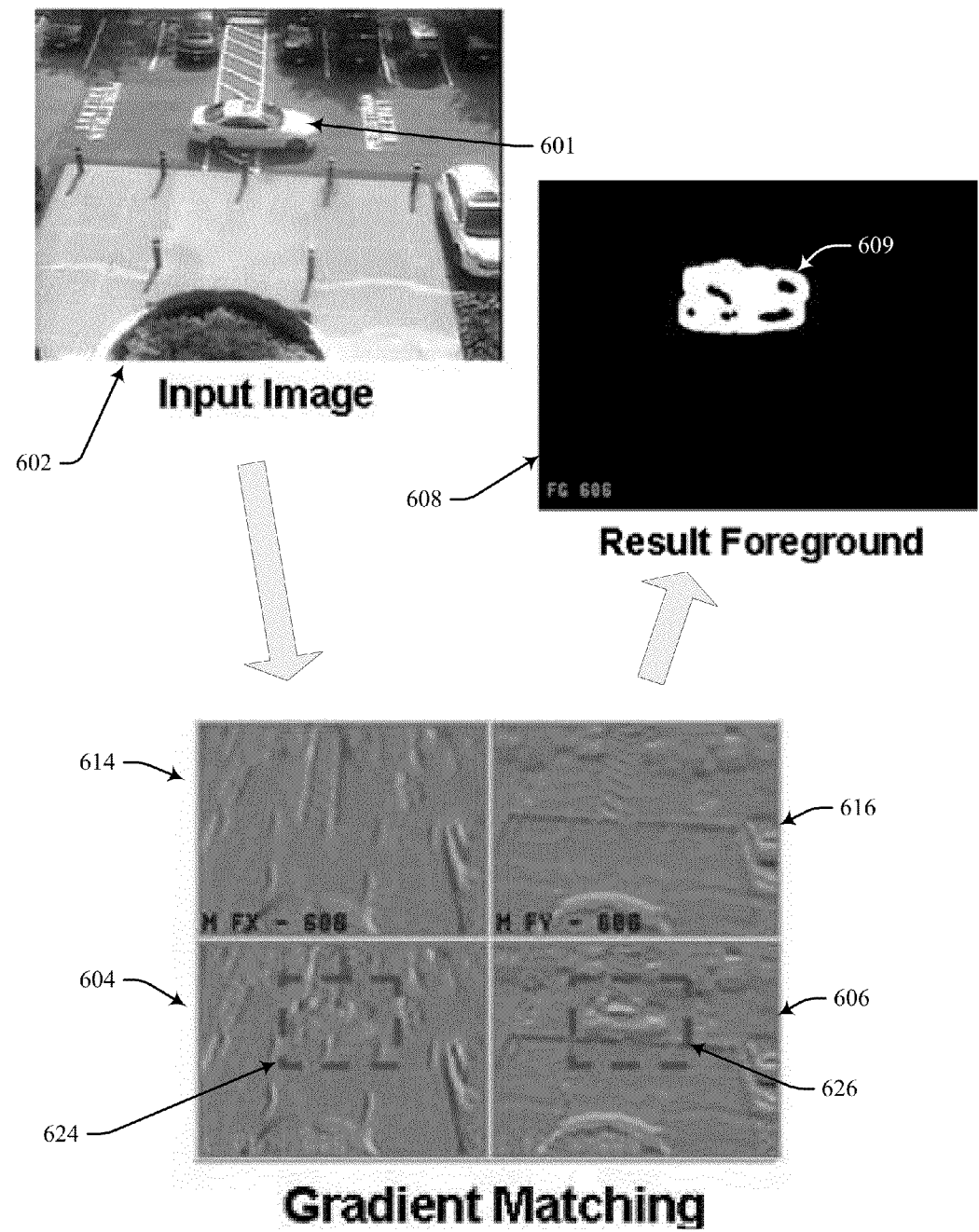
FIG. 6 is a block diagram illustration of an embodiment of a method, process or system of the present invention.

FIG. 4 illustrates a horizontal (x) background model 416 and a vertical (y) background model 418 generated from the respective horizontal dimension pixel gradient (Fx) 406 and a vertical dimension pixel gradient (Fy) 408. FIG. 6 shows an example foreground detection result 608 wherein a foreground object mask 609 is generated in response to a non-static object (automobile) 601 in an input image 602 from the results 624 and 626 matching a horizontal dimension pixel gradient (Fx) 604 and a vertical dimension pixel gradient (Fy) 606 to respective horizontal (x) and vertical (y) background models 614, 616, as described above with respect to FIGS. 1-5.

Thus, embodiments of the present invention represent each pixel by a set of feature clusters derived from the dimensional gradients of that pixel over time. The feature clusters are collected and constructed by assigning equal weights to all pixel samples, independent of time considerations: the resultant background model has the same memory for samples obtained recently as for those obtained in the past. Thus, it is more robust against the incorrect adaptation problem. In another aspect, the number of the gradient models for a given image pixel is generally variable, in one aspect as relatively stable areas need fewer model inputs to update the background, but while areas relatively rich with motion need more model data for accurate updating. The embodiment is also more robust against lighting changes over time than prior art background modeling techniques that rely upon color information.

Embodiments of the present invention thus provide solutions for separating foreground objects from background in videos acquired by stationary cameras where the true background is constant in the selected feature space. Pixel gradients are smoothed (averaged) in the spatial domain through considering the average of neighborhood gradients, rather than computing the temporal average of the gradient of only matched pixels. Averaging is not limited to only those pixels at the same image location, as is taught by the prior art; such prior art limitations may provide a temporal smoothness of a same object over time, but without providing spatial smoothness around its neighborhood. Embodiments of the present invention temporally cluster the gradients into pixel models, which are the clusters of similar gradients of the same pixels over time. Embodiments of the present invention also combine both parametric representations of the models (via the means of the gradients) with a kernel density estimation technique.

Figure 7:
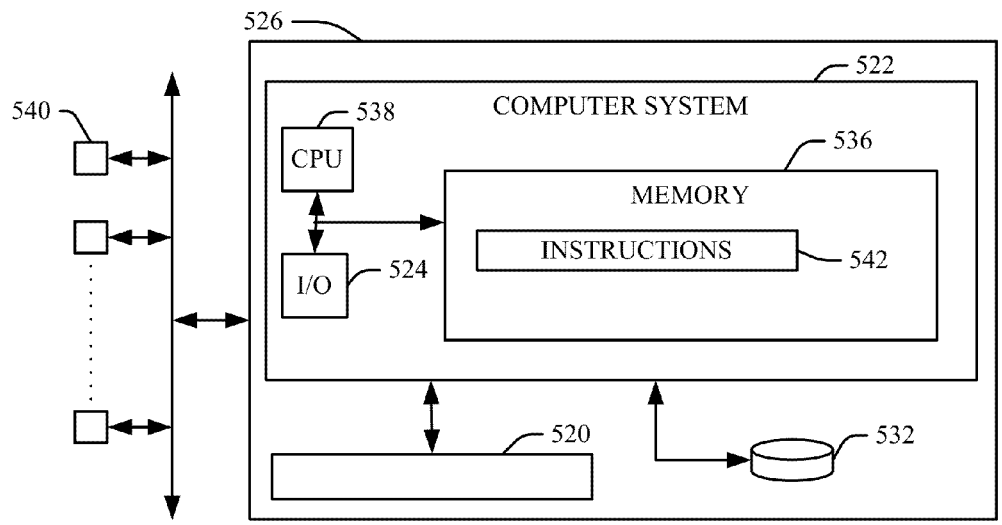
FIG. 7 is a block diagram illustration of a computerized implementation of an embodiment of the present invention.

Referring now to FIG. 7, an exemplary computerized implementation of an embodiment of the present invention includes a computer or other programmable device 522 in communication with one or more cameras or other sources 540 of the input video data 101. Instructions 542 reside within computer readable code in a computer readable memory 536, or in a computer readable storage system 532, or other tangible computer readable storage medium that is accessed through a computer network infrastructure 526 by a processing unit (CPU) 538. Thus, the instructions, when implemented by the processing unit (CPU) 538, cause the processing unit (CPU) 538 to perform long-term understanding of background modeling as described above with respect to FIG. 1, and in some embodiments of the present invention also with respect to one or more of FIGS. 2-6.

Figure 8:
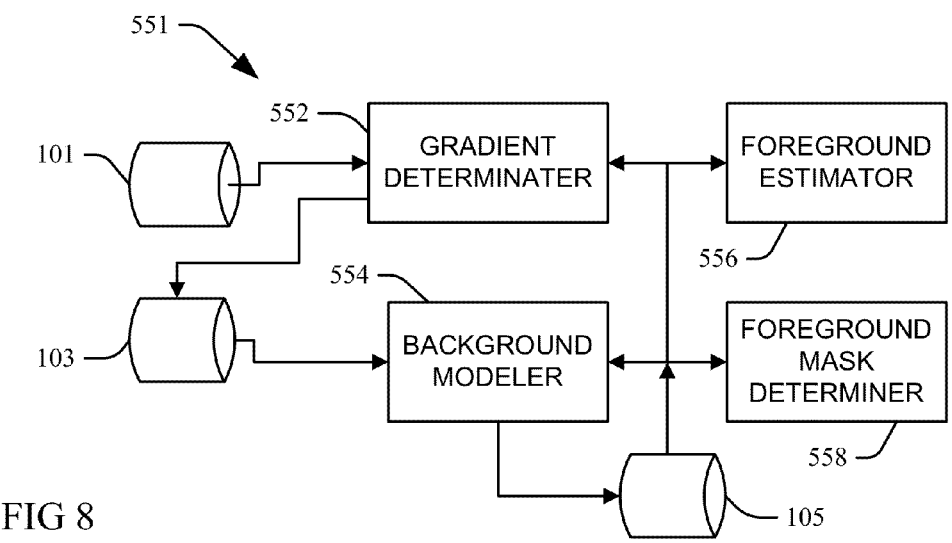
FIG. 8 is a block diagram illustration of an article according to the present invention.

FIG. 8 illustrates an embodiment of an article 551 (for example, a programmable device, system, etc.) according to the present invention that performs an automated long-term understanding of background modeling as described above with respect to FIG. 1, and in some embodiments of the present invention also with respect to one or more of FIGS. 2-7. One or more of the components of the article 551 are tangible devices that perform specific functions, for example comprising the processing unit 538, computer readable memory 516 and tangible computer readable storage medium 532 of FIG. 7. More particularly, a Gradient Determiner 552 uses features extracted from the input video data 101 to determine dimensional gradient models for the image data pixels, and defines the average image pixel gradient models 103 for pixels by averaging the determined gradients with previous gradients of the pixel and also with gradients of neighboring pixels as a function of their distance to the pixel. A Background Modeler constructs and updates the background models 105 using the averaged pixel gradient data 103 via means of gradient samples having similar orientation and magnitude, and wherein each model set is also associated with a weight which determines if the pixel represents background or non-background data. A Foreground Estimator 556 uses the constructed background models 105 to estimate foreground areas in image data by comparing the averaged pixel gradients 103 with the corresponding background models 105, wherein a pixel is determined to be a foreground (non-background) pixel if the distance from the pixel's gradient to the background model is equal to or above a threshold distance value, or if the distance is less than the threshold, but it is closer to another foreground model than to the background model. The output of the Foreground Estimator 556 is used by a Foreground Mask Determiner to define a foreground masks representing foreground objects.

Embodiments of the present invention may also perform process steps of the invention on a subscription, advertising, and/or fee basis. That is, a service provider could offer to perform automated long-term understanding of background modeling as described above with respect to FIGS. 1-8. Thus, the service provider can create, maintain, and support, etc., a computer infrastructure such as the computer system 522, network environment 526, or parts thereof, or the article 551, that perform the process steps of the invention for one or more customers. In return, the service provider can receive payment from the customer(s) under a subscription and/or fee agreement and/or the service provider can receive payment from the sale of advertising content to one or more third parties. Services may comprise one or more of: (1) installing program code on a computing device, such as the computers/devices 522/551, from a tangible computer-readable medium device 520 or 532; (2) adding one or more computing devices to a computer infrastructure; and (3) incorporating and/or modifying one or more existing systems of the computer infrastructure to enable the computer infrastructure to perform the process steps of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising" when used in this specification, specify the presence of stated features, integers, steps, operations, elements, and/or components, but do not preclude the presence or addition of one or more other features, integers, steps, operations, elements, components, and/or groups thereof. Certain examples and elements described in the present specification, including in the claims and as illustrated in the Figures, may be distinguished or otherwise identified from others by unique adjectives (e.g. a "first" element distinguished from another "second" or "third" of a plurality of elements, a "primary" distinguished from a "secondary" one or "another" item, etc.) Such identifying adjectives are generally used to reduce confusion or uncertainty, and are not to be construed to limit the claims to any specific illustrated element or embodiment, or to imply any precedence, ordering or ranking of any claim elements, limitations or process steps.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for long-term understanding of background modeling, the method comprising:
    determining a first dimension gradient model derivative of image brightness data of an image pixel along a first dimension of two-dimensional image data, and a second dimension gradient model derivative of the image brightness data of the image pixel along the second dimension of the two-dimensional image data, wherein the image brightness data is a single channel of color information extracted from video image data of a static image scene;
    averaging via a processing unit the determined gradients with any previous determined gradients of the image pixel, and with gradients of each of a plurality of neighboring pixels as a function of the respective distances of the neighboring pixels to the image pixel, the averaging generating averaged pixel gradient models for each of a plurality of pixels of the video image data of the static image scene that each have mean values and weight values; and
    constructing via the processing unit background models for the static image scene as a function of the averaged pixel gradient model mean values and weight values, wherein each pixel in the background model is represented by a set of the averaged pixel gradient models that each have similar orientation and magnitude and have a weight meeting a background threshold weight requirement.

2. The method of claim 1, wherein the step of constructing the background models further comprises:
    estimating foreground areas in the static image by comparing the averaged pixel gradient models with the corresponding pixel background models;
    determining that a first pixel is a foreground pixel if a mean distance from the first pixel averaged pixel gradient model mean value to a mean value of a corresponding pixel averaged pixel gradient model is equal to or greater than a threshold mean distance value, or if the distance of the first pixel averaged pixel gradient model mean value is less than the threshold mean distance value and the first pixel averaged pixel gradient model mean value is closer to a foreground pixel model mean value than to the corresponding background model pixel mean value; and
    determining that the first pixel is a background model pixel if not determined as a foreground pixel.

3. The method of claim 2, wherein the steps of determining the gradients and averaging the determined gradients further comprise:
    convolving extracted image feature data of the image pixel with a horizontal filter for a horizontal dimension of the static image to generate a horizontal dimension pixel gradient, and with a vertical filter for a vertical dimension of the static image, to generate a vertical dimension pixel gradient;
    averaging the horizontal dimension pixel gradient with horizontal dimension pixel gradients of the any previous determined gradients of the image pixel, and with horizontal dimension pixel gradients of the each of the plurality of neighboring pixels as a function of the respective distances of the neighboring pixels to the image pixel; and
    averaging the vertical dimension pixel gradient with vertical dimension pixel gradients of the any previous determined gradients of the image pixel, and with vertical dimension pixel gradients of the each of the plurality of neighboring pixels as a function of the respective distances of the neighboring pixels to the image pixel.

4. The method of claim 3, wherein the step of constructing via the processing unit the background models for the static image scene as the function of the averaged pixel gradient model mean values and weight values further comprises:
    determining if there is an existing model for the image pixel;
    if determined that there is not an existing model, initiating a first model for the image pixel comprising the image pixel averaged gradient mean value as a first model mean, and an initial weight of one;
    if determined that there is at least one existing model, determining distances between the image pixel averaged gradient mean value and the means of each of the at least one existing models to identify a model having the smallest model distance, and if the smallest model distance meets a matching threshold requirement, updating the mean of identified existing model to an absolute average mean as a function of the image pixel averaged gradient mean value, and incrementing a weight of the identified model;
    updating weights of models neighboring the image pixel with a factor defined by a decaying kernel function as a function of their distance to the image pixel; and updating background models in response to the first or updated models, wherein the pixel models with largest weights represent the background and other pixel models without the largest weights represent foreground data.

5. The method of claim 4, wherein the step of updating the background models further comprises, if two models have the same weights, considering a one of the two models with a later in time observation as a background model.

6. The method of claim 5, further comprising:
if the input video data is color image data comprising more than one channel of color information, converting the image data to grey-scale image data comprising only one channel of color for the image brightness data.

7. A system, comprising:
a processing unit, a computer readable memory and a computer-readable storage medium;
wherein the processing unit, when executing program instructions stored on the computer-readable storage medium via the computer readable memory:
determines a first dimension gradient model derivative of image brightness data of an image pixel along a first dimension of two-dimensional image data, and a second dimension gradient model derivative of the image brightness data of the image pixel along the second dimension of the two-dimensional image data, wherein the image brightness data is a single channel of color information extracted from video image data of a static image scene;
averages the determined gradients with any previous determined gradients of the image pixel, and with gradients of each of a plurality of neighboring pixels as a function of the respective distances of the neighboring pixels to the image pixel, the averaging generating averaged pixel gradient models for each of a plurality of pixels of the video image data of the static image scene that each have mean values and weight values; and
constructs background models for the static image scene as a function of the averaged pixel gradient model mean values and weight values, wherein each pixel in the background model is represented by a set of the averaged pixel gradient models that each have similar orientation and magnitude and have a weight meeting a background threshold weight requirement.

8. The system of claim 7, wherein the processing unit, when executing the program instructions stored on the computer-readable storage medium via the computer readable memory, further constructs the background models by:
estimating foreground areas in the static image by comparing the averaged pixel gradient models with the corresponding pixel background models;
determining that a first pixel is a foreground pixel if a mean distance from the first pixel averaged pixel gradient model mean value to a mean value of a corresponding pixel averaged pixel gradient model is equal to or greater than a threshold mean distance value, or if the distance of the first pixel averaged pixel gradient model mean value is less than the threshold mean distance value and the first pixel averaged pixel gradient model mean value is closer to a foreground pixel model mean value than to the corresponding background model pixel mean value; and
determining that the first pixel is a background model pixel if not determined as a foreground pixel.

9. The system of claim 8, wherein the processing unit, when executing the program instructions stored on the computer-readable storage medium via the computer readable memory, further determines the gradients and averages the determined gradients by:
convolving extracted image feature data of the image pixel with a horizontal filter for a horizontal dimension of the static image to generate a horizontal dimension pixel gradient, and with a vertical filter for a vertical dimension of the static image, to generate a vertical dimension pixel gradient;
averaging the horizontal dimension pixel gradient with horizontal dimension pixel gradients of the any previous determined gradients of the image pixel, and with horizontal dimension pixel gradients of the each of the plurality of neighboring pixels as a function of the respective distances of the neighboring pixels to the image pixel; and
averaging the vertical dimension pixel gradient with vertical dimension pixel gradients of the any previous determined gradients of the image pixel, and with vertical dimension pixel gradients of the each of the plurality of neighboring pixels as a function of the respective distances of the neighboring pixels to the image pixel.

10. The system of claim 9, wherein the processing unit, when executing the program instructions stored on the computer-readable storage medium via the computer readable memory, further constructs the background models for the static image scene as the function of the averaged pixel gradient model mean values and weight values by:
determining if there is an existing model for the image pixel;
if determined that there is not an existing model, initiating a first model for the image pixel comprising the image pixel averaged gradient mean value as a first model mean, and an initial weight of one;
if determined that there is at least one existing model, determining distances between the image pixel averaged gradient mean value and the means of each of the at least one existing models to identify a model having the smallest model distance, and if the smallest model distance meets a matching threshold requirement, updating the mean of identified existing model to an absolute average mean as a function of the image pixel averaged gradient mean value, and incrementing a weight of the identified model;
updating weights of models neighboring the image pixel with a factor defined by a decaying kernel function as a function of their distance to the image pixel; and
updating background models in response to the first or updated models, wherein the pixel models with largest weights represent the background and other pixel models without the largest weights represent foreground data.

11. The system of claim 10, wherein the processing unit, when executing the program instructions stored on the computer-readable storage medium via the computer readable memory, further updates the background models in response to two pixel models having the same weights by considering a one of the two models with a later in time observation as a background model, and the other of the two pixel models as a foreground model.

12. An article of manufacture, comprising:
a computer readable tangible storage medium having computer readable program code embodied therewith, the computer readable program code comprising instructions that, when executed by a computer processor, cause the computer processor to:

determine a first dimension gradient model derivative of image brightness data of an image pixel along a first dimension of two-dimensional image data, and a second dimension gradient model derivative of the image brightness data of the image pixel along the second dimension of the two-dimensional image data, wherein the image brightness data is a single channel of color information extracted from video image data of a static image scene;

average the determined gradients with any previous determined gradients of the image pixel, and with gradients of each of a plurality of neighboring pixels as a function of the respective distances of the neighboring pixels to the image pixel, the averaging generating averaged pixel gradient models for each of a plurality of pixels of the video image data of the static image scene that each have mean values and weight values; and construct background models for the static image scene as a function of the averaged pixel gradient model mean values and weight values, wherein each pixel in the background model is represented by a set of the averaged pixel gradient models that each have similar orientation and magnitude and have a weight meeting a background threshold weight requirement.

13. The article of manufacture of claim 12, wherein the computer readable program code instructions, when executed by the computer processor, further cause the computer processor to:

estimate foreground areas in the static image by comparing the averaged pixel gradient models with the corresponding pixel background models;

determine that a first pixel is a foreground pixel if a mean distance from the first pixel averaged pixel gradient model mean value to a mean value of a corresponding pixel averaged pixel gradient model is equal to or greater than a threshold mean distance value, or if the distance of the first pixel averaged pixel gradient model mean value is less than the threshold mean distance value and the first pixel averaged pixel gradient model mean value is closer to a foreground pixel model mean value than to the corresponding background model pixel mean value; and determine that the first pixel is a background model pixel if not determined as a foreground pixel.

14. The article of manufacture of claim 1, wherein the computer readable program code instructions, when executed by the computer processor, further cause the computer processor to determine the gradients and average the determined gradients by:

convolving extracted image feature data of the image pixel with a horizontal filter for a horizontal dimension of the static image to generate a horizontal dimension pixel gradient, and with a vertical filter for a vertical dimension of the static image, to generate a vertical dimension pixel gradient;

averaging the horizontal dimension pixel gradient with horizontal dimension pixel gradients of the any previous determined gradients of the image pixel, and with horizontal dimension pixel gradients of the each of the plurality of neighboring pixels as a function of the respective distances of the neighboring pixels to the image pixel; and averaging the vertical dimension pixel gradient with vertical dimension pixel gradients of the any previous determined gradients of the image pixel, and with vertical dimension pixel gradients of the each of the plurality of neighboring pixels as a function of the respective distances of the neighboring pixels to the image pixel.

15. The article of manufacture of claim 14, wherein the computer readable program code instructions, when executed by the computer processor, further cause the computer processor to construct the background models for the static image scene as the function of the averaged pixel gradient model mean values and weight values by:

determining if there is an existing model for the image pixel;

if determined that there is not an existing model, initiating a first model for the image pixel comprising the image pixel averaged gradient mean value as a first model mean, and an initial weight of one;

if determined that there is at least one existing model, determining distances between the image pixel averaged gradient mean value and the means of each of the at least one existing models to identify a model having the smallest model distance, and if the smallest model distance meets a matching threshold requirement, updating the mean of identified existing model to an absolute average mean as a function of the image pixel averaged gradient mean value, and incrementing a weight of the identified model;

updating weights of models neighboring the image pixel with a factor defined by a decaying kernel function as a function of their distance to the image pixel; and updating background models in response to the first or updated models, wherein the pixel models with largest weights represent the background and other pixel models without the largest weights represent foreground data, and if two pixel models have the same weights, then considering the one of the two models having a later in time observation as a background pixel model and the other of the two pixel models as a foreground pixel model.

* * * * *